United States Patent
Shpantzer et al.

(10) Patent No.: US 7,840,144 B2
(45) Date of Patent: Nov. 23, 2010

(54) COHERENT OPTICAL TRANSCEIVER AND COHERENT COMMUNICATION SYSTEM AND METHOD FOR SATELLITE COMMUNICATIONS

(75) Inventors: Isaac Shpantzer, Bethesda, MD (US); Sabera Kazi, Los Altos, CA (US)

(73) Assignee: CeLight, Inc., Silver Spring, MD (US)

( * ) Notice: Subject to any disclaimer, the term of this patent is extended or adjusted under 35 U.S.C. 154(b) by 715 days.

(21) Appl. No.: 11/867,351

(22) Filed: Oct. 4, 2007

(65) Prior Publication Data

US 2008/0025728 A1 Jan. 31, 2008

Related U.S. Application Data

(63) Continuation-in-part of application No. 10/669,130, filed on Sep. 22, 2003, now Pat. No. 7,327,913, and a continuation-in-part of application No. 10/613,772, filed on Jul. 2, 2003, now Pat. No. 7,272,271, and a continuation-in-part of application No. 11/610,964, filed on Dec. 14, 2006, now Pat. No. 7,397,979, and a continuation-in-part of application No. 11/672,372, filed on Feb. 7, 2007, now Pat. No. 7,483,600.

(60) Provisional application No. 60/850,085, filed on Oct. 6, 2006.

(51) Int. Cl.
*H04B 10/06* (2006.01)

(52) U.S. Cl. ........................ 398/208; 398/211; 398/194; 398/158; 398/25

(58) Field of Classification Search ......... 398/208–211, 398/158, 194, 128, 121, 25; 375/226, 227, 375/232

See application file for complete search history.

(56) References Cited

U.S. PATENT DOCUMENTS

| | | | | |
|---|---|---|---|---|
| 4,891,611 A | * | 1/1990 | Frerking | 331/158 |
| 5,053,714 A | * | 10/1991 | Durand | 324/613 |
| 5,157,596 A | * | 10/1992 | Alcone | 700/55 |
| 7,555,227 B2 | * | 6/2009 | Bontu et al. | 398/202 |
| 7,711,273 B2 | * | 5/2010 | Koc | 398/202 |
| 2004/0042802 A1 | * | 3/2004 | Ho et al. | 398/208 |
| 2004/0114939 A1 | * | 6/2004 | Taylor | 398/152 |
| 2006/0013590 A1 | * | 1/2006 | Hueda et al. | 398/149 |
| 2006/0245766 A1 | * | 11/2006 | Taylor | 398/208 |
| 2008/0025728 A1 | * | 1/2008 | Shpantzer et al. | 398/104 |

* cited by examiner

*Primary Examiner*—Ken N Vanderpuye
*Assistant Examiner*—Hibret A Woldekidan
(74) *Attorney, Agent, or Firm*—Nadya Reingand

(57) ABSTRACT

An optical transceiver is provided for optical communications with additive noise compensation. The system and method are disclosed for the additive noise cancellation, which is typically a vibration noise, caused by moving platform, where the transceiver is located. The transceiver comprises an additive noise sensor and a digital signal processing (DSP) unit which implements variable step size technique to adjust the filter weight in the least square estimate of the noise signal. In the preferred embodiment the digital signal processing is applied both at the transmission and the receiving side. The optical device is packed for ground-satellite and inter-satellite communications applications with resistance to high-energy X-rays, gamma rays and cosmic rays. The optical device sustains its operation characteristics under launch load.

16 Claims, 6 Drawing Sheets

COHERENT OPTICAL TRANSCEIVER AND COHERENT COMMUNICATION SYSTEM AND METHOD FOR SATELLITE COMMUNICATIONS

CROSS-REFERENCE TO RELATED APPLICATIONS

This application claims priority to U.S. provisional application Ser. No. 60/850,085 filed Oct. 6, 2006. This application is a continuation-in-part of U.S. patent application Ser. No. 10/669,130 filed Sep. 22, 2003 now U.S. Pat. No. 7,327,913 and is also a continuation-in-part of U.S. patent application Ser. No. 10/613,772 filed Jul. 2, 2003 now U.S. Pat. No. 7,272,271, U.S. patent application Ser. No. 11/610,964 filed Dec. 14, 2006 now U.S. Pat. No. 7,397,979 and U.S. patent application Ser. No. 11/672,372 filed Feb. 7, 2007 now U.S. Pat. No. 7,483,600 all of which applications are fully incorporated herein by reference.

FIELD OF INVENTION

This invention relates generally to optical systems and methods used in optical satellite communications and in some other optical systems suffering from hard radiation and various types of vibration and noises. In particular the invention addresses systems that implement coherent optical detection technique combined with digital signal processing for vibration noise reduction.

BACKGROUND OF THE INVENTION

Microwave satellite communication links with data rate of about 500 Mb/s does not possess enough capacity to meet the increasing data transmission demand. Optical communication links with data rates of 40 Gb/s and above can be adapted for high speed satellite communication network, which in particular may include multi channel video data broadcast.

U.S. Pat. No. 6,782,212 and U.S. Pat. No. 6,798,994 by Tsao disclose an optical satellite communication with coherent detection, which is considered be the most promising configuration of the future optical satellite networks. In particular they address the problem of laser frequency drifting and the methods of its compensation. However those patents did not explore the signal corruption caused by the additive phase-noise resulting from vibration onboard the satellite.

Various approaches for additive noise cancellation in optical systems are disclosed in the U.S. Pat. No. 5,157,596 by Alcone et al., U.S. Pat. No. 6,034,760 by Ress, F., U.S. Pat. No. 6,393,311 by Edgar et al.; U.S. Patent application No. 20040071207 by Skidmore; and U.S. Patent application No. 20040155794 by Gardner, incorporated herein by references.

There is still a need to improve stability and accelerate convergence algorithm for data processing in communications systems, to recover reliable data in worse signal-to-noise (SNR) scenario, to provide system operation in the presence of wide spectrum additive noise. The system disclosed in the present invention addresses the drawbacks listed above of the prior art.

It is well known ionizing radiation, such as cosmic rays, gamma rays, and hard X-rays degrade electro-optical device performance in space. U.S. Pat. No. 6,605,818 discloses a protective coating composition and a method of its deposition to protect opto-electronics from harmful radiation. There is a need for a complex approach to the development of satellite communication system transceivers, which includes both vibration elimination and protection from ionizing radiation.

SUMMARY OF THE INVENTION

The innovation approach is applicable to all optical communications systems where phase is used for data modulation, namely in satellite, free-space and fiber communications, as well as to remote sensing, LADARs, and other applications.

The system and method are disclosed for the additive noise cancellation, which is typically a vibration noise, caused by moving platform, where the transceiver is located. Data transmission from one location to another is performed using PSK modulation format. In the preferred embodiment QPSK or QAM modulation is applied. The signal correction is applied both to the transmitter and to the receiver side. A first means located on the receiver platform measures an additive phase noise and provides a correcting signal. The receiver comprises a digital signal processing (DSP) unit for fast elimination of additive noise in the signal basing on the correcting signal.

The DSP unit implements an active noise control technique. The system calculates the power of the data window and modifies the step size for updating the filter coefficients to least square estimate of the noise signal. Thus the disclosed technique operates in a higher dynamic range of signal to noise ratio (SNR) compared to traditional approaches. As the SNR varies from window to window, the adaptation size of the step varies choosing the appropriate value.

The system further comprises a transmitter with a second means for additive noise compensation at the transmitter side. The transmitter further comprises a light source generating an initial optical beam and a phase modulator providing a modulation of the initial optical beam with data. The phase modulator also provides a correction of the modulation basing on the second correction signal from the second means.

In the preferred embodiment the transceiver comprises an accelerometer for measuring the platform vibrations, which cause the additive noise in the optical signal.

In the preferred embodiment the transceiver has a protective coating covering the coherent receiver, the first means and the digital signal processing unit to shield them from hard radiation.

BRIEF DESCRIPTION OF THE DRAWINGS

FIG. 6(b) is the results of the signal adaptive filtering, and FIG. 6(c) shows the signal after threshold detection.

DETAILED DESCRIPTION OF THE PREFERRED EMBODIMENT

The present invention is now described more fully with reference to the accompanying figures, in which some of all possible embodiments of the invention are shown. The present invention may be embodied in various forms and should not be viewed as limited to the embodiments set forth herein. Rather these embodiments are provided so that this disclosure will be thorough and complete and will fully disclose the invention to those skilled in the art.

The invention primarily addresses communication links with phase shift keying data modulation format, namely binary phase shift keying (BPSK), quadrature phase shift keying (QPSK), M-ary phase shift keying (M-PSK), M-ary quadrature amplitude modulation (M-QAM). These modulation formats considered to be the most promising in the next generation of optical communication in free space, intersatellite, ground-satellite, submarine or terrestrial fiber links.

The invention is not limited to phase modulated optical communications systems, but certain innovative aspects can be implemented either in remote sensing, LADARs, or other commercial and military applications.

Figure 1:
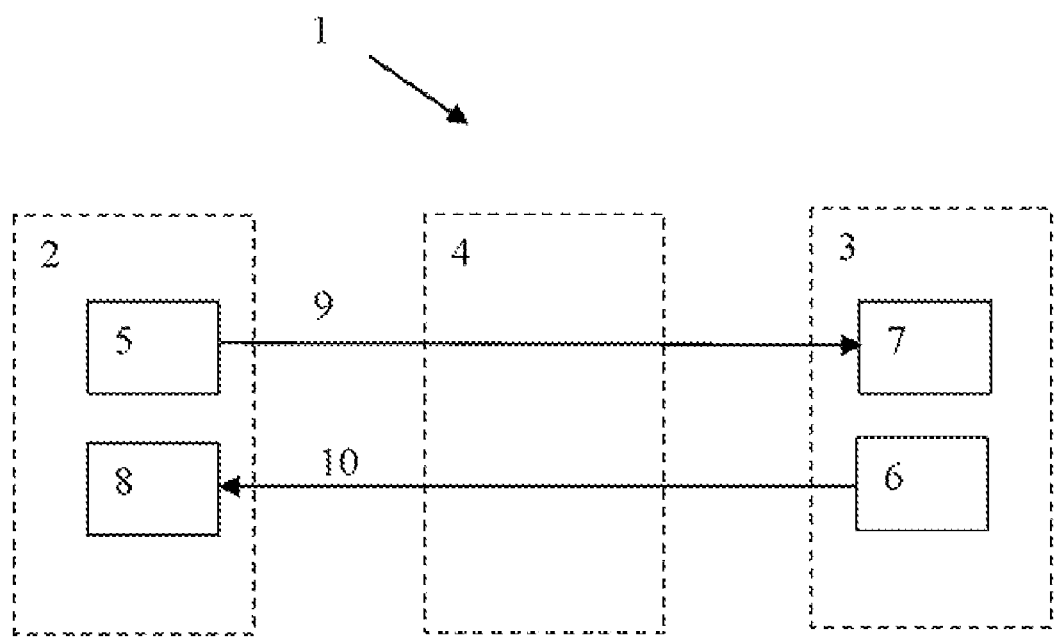
FIG. 1 illustrates bi-directional optical communications system.
Figure 2:
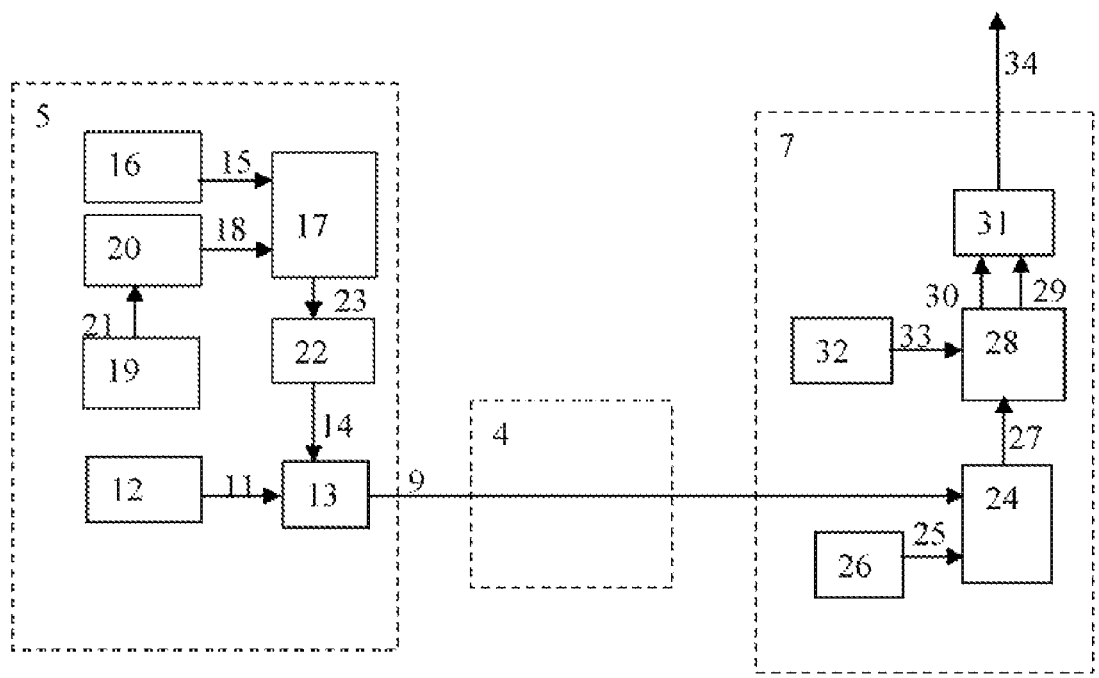
FIG. 2 shows PSK data transmission and detection via optical communications link.

The block diagram of a coherent optical communication system 1 is shown in FIG. 1, where optical transceivers 2 and 3 (e.g. located on satellites) are separated by a medium 4. The transceivers include transmitters 5,6 and receivers 7,8 respectively. The data transmission operates in both directions 9 and 10. Both transceiver platform vibrations and the medium instability introduce additive noise in the phase of the transmitted light signal. This noise is crucial for the system performance since the data is encoded in the optical signal phase. In the preferred embodiment the data is transmitted in QPSK format, however any type of PSK modulated signals are sensitive to the additive noise. FIG. 2 illustrates data modulation and detection according to the present invention.

Figure 3:
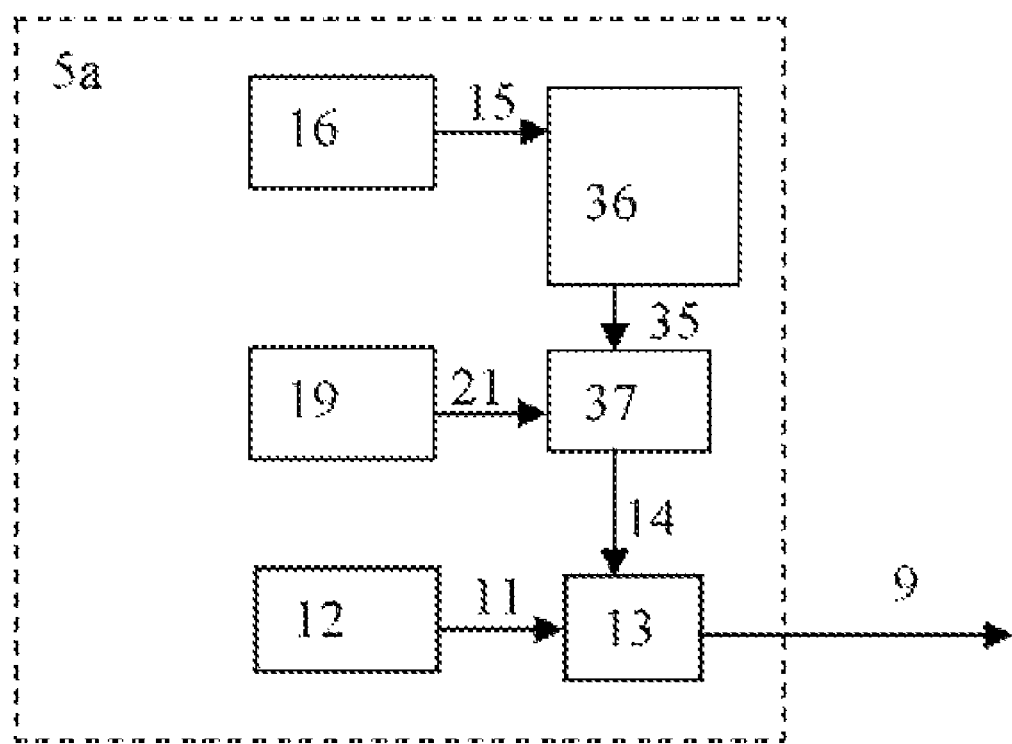
FIG. 3 shows one embodiment of the transmitter.

A laser beam 11 generated by a laser 12 is modulated with data by a phase modulator 13 controlled by a driving signal 14. In the preferred embodiment the modulator 13 is a QPSK modulator, and the driving signal 14 consists of two RF signals: I and Q. Each I and Q parts of the driving signal 14 has double function. First, it provides modulation of the laser beam with data to be transmitted. Second, it introduces additional phase shift to compensate the transceiver 2 vibrations. A digital data stream 15 from a data generator unit 16 enters a transmitter digital signal processing unit 17, where it is combined with a digital correction stream 18. The correction stream 18 carries information on the transceiver vibrations received from a transmitter sensor 19 and transformed into digital format by a transmitter A/D unit 20. In one embodiment the transceiver vibration stream 18 is subtracted from the data stream 15 to eliminate the additive noise component. More sophisticated algorithm for the data stream processing in the unit 17 may be applied. A D/A unit 22 converts the output signal 23 from the unit 17 into an analog signal 14. An alternative embodiment of the data stream processing is shown in FIG. 3 and will be discussed later. The modulated beam 9 impinges a coherent optical receiver 24 after passing through the medium 4; at the receiver it is mixed with a local oscillator optical signal 25 generated by a local oscillator 26. An output electrical signal 27 enters a receiver A/D converter 28. The output signal 29 is mixed with a digital correction signal 30 in a receiver digital signal processing unit (DSP) 31. Signal processing in the DSP unit 31 improves the SNR of the signal 29 by eliminating the additive noise caused by the receiver vibrations. The algorithm of the DSP unit 31 operation is discussed below. The digital correction signal 30 carries information about the receiver 7 vibrations from a receiver sensor 32. The converter 28 transforms an analog signal 33 from the sensor 32 into the digital signal 30. An output signal 34 has improved SNR after digital signal processing; it can be displayed or used for further data processing.

FIG. 3 shows one embodiment of the PSK optical signal transmitter 5a with additive noise compensation. A laser beam 11 generated by a laser 12 is modulated with data by a phase modulator 13 controlled by a driving signal 14. In the preferred embodiment the modulator 13 is a QPSK modulator, and the driving signal 14 consists of two RF signals: I and Q. The digital data stream 15 from the data generator 16 is converted into analog signal 35 in D/A unit 36. A mixer 37 subtracts the correction stream 21 (with data on the transceiver vibration from the sensor 19) from the data stream 35. The output signal 14 is applied to the phase modulator 13 to obtain an optical beam 9 with corrected phase encoding.

In the preferred embodiment Accelerometers KXP74-1050 from Kionix, Ithaca, N.Y. are used as the sensors 19 and 32.

The same sensor may be used for both transmitter and receiver located at the same site as shown in FIG. 1. For example, the transmitter 5 and the receiver 8 may obtain the correcting signal from the same sensor positioned on the platform 2.

The preferred embodiment of the QPSK modulator is disclosed in U.S. Pat. No. 7,272,271 by the same assignee, incorporated herein by reference.

The preferred embodiment of the coherent optical receiver 24 is described in details in U.S. patent applications Pub. Nos. 20070110362, 20040096143, 20070140613 by the same inventors as the present invention, all of the applications are incorporated herein by reference.

Figure 4:
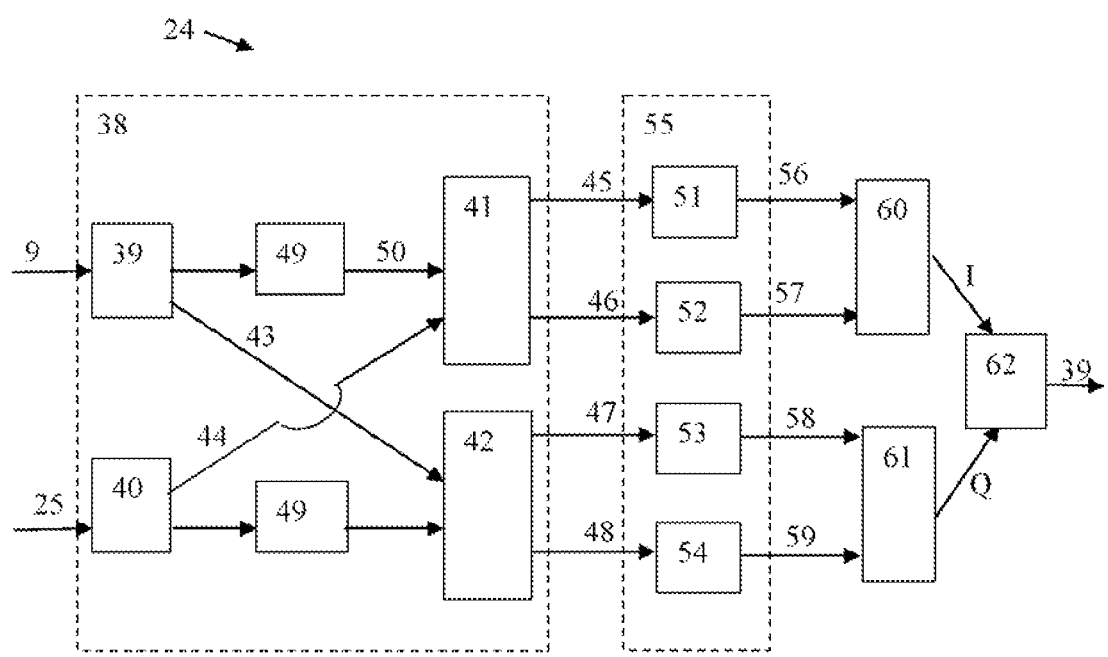
FIG. 4 shows block diagram of a coherent optical receiver based on 90-degrees optical hybrid.

FIG. 4 illustrates the structure and operation principles of the coherent optical receiver 24 based on a 90-degrees optical hybrid 38. In this embodiment, the two incoming light signals 9 and 25 impinge the optical hybrid 38, each subsequently divided into two optical signals. The division can be achieved by a variety of different ways, including but not limited to use of 3 dB couplers 39 and 40, respectively. The light from coupler 39 further directed to the couplers 41 and 42 and light from coupler 40 further directed to the couplers 41 and 42, in such a way that the waveguides 43 and 44 are crossed without interaction. The two, preferably 3 dB, couplers 41 and 42 further mix the corresponded input signals and produce four optical outputs 45, 46, 47 and 48. At least one phase shifter 49 is placed on waveguide structure 50 in-between the first set of the couplers 39 and 41 or the second set of the couplers 40 and 42. The beam which passes through the phase shifter 49 gains the additional phase shift. Output optical fields 45-48 are converted into electric currents by four PIN photodiodes 51, 52, 53 and 54. It will be appreciated that device other than the four PIN photodiodes 55 can be utilized. In the preferred embodiment photodiodes 51,52 and 53,54 are pairs of balanced receivers with a corresponding trans-impedance amplifier. If couplers 39, 40, 41 and 42 all are 3 dB couplers, and the single phase shift 49 provides 90-degrees phase shift, then all four outputs 56, 57, 58, 59 have 90-degrees relative phase difference of the form: {A=S+L, B=S−L, C=S+jL D=S−jL respectively}, where S is the signal 9 and L is the local oscillator 25. Mixers 60 and 61 produce I and Q electrical outputs which form the receiver output 29 after mixer 62.

Implementation of the 90-degrees optical hybrid 24 and digital signal processing unit 31 allows information transmitting at 40 Gbit/s rate in varying environmental conditions with compensation for the transceivers vibration.

The transceiver platform vibration in satellite PSK communications causes changes in phase of the optical signal. The phase of the received signal is corrupted with a slow varying error signal due to vibrations. The resulting expression for the received signal phase is the following:

$$e^{j(\phi(t)+\phi_n(t))}$$

where vibration is shown as an additive phase noise $\phi_n(t)$. An adaptive filter algorithm is applied to process the received signal phase and to cancel the additive noise.

The innovative approach is based on implementation of an active noise control, which involves an opto-electronic system combined with a signal processing that cancels the noise based on the principle of superposition. Specifically, an "anti-noise" of equal amplitude and opposite phase is generated and combined with corrupted signal resulting in the SNR improvement.

Figure 5:
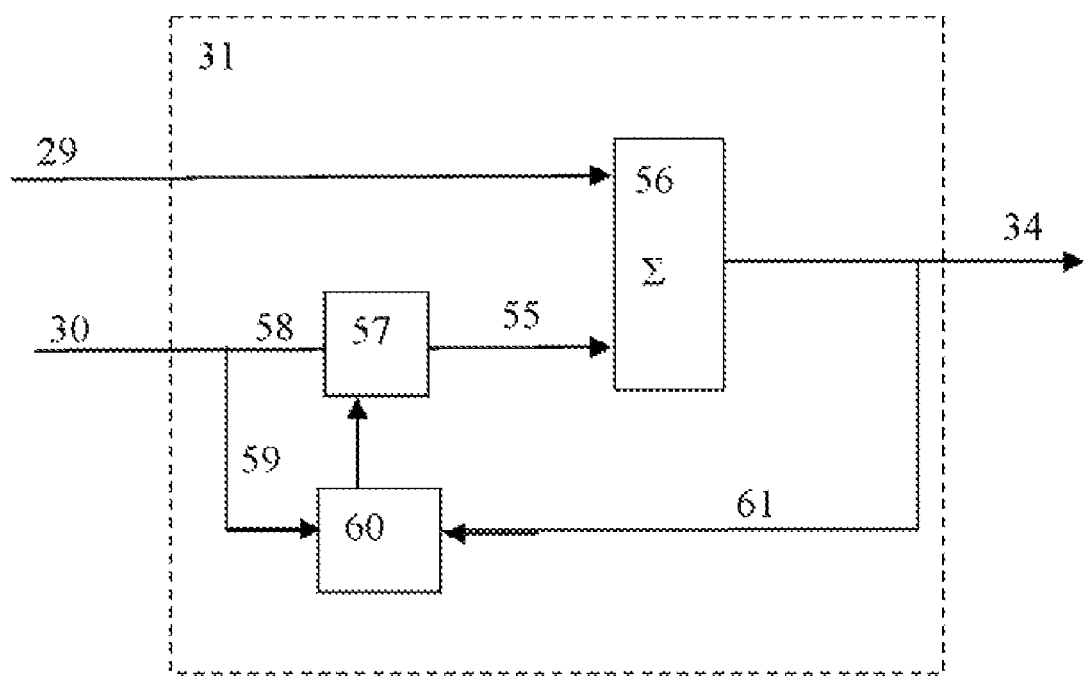
FIG. 5 shows block diagram of the adaptive filtering according to the present invention.

Adaptive digital filtering scheme is employed, which allows to accomplish system adjustment to changing parameters of the physical environment, in which the signal is transmitted. The adaptive digital filter consists of two distinct parts: a digital filter to perform the desired signal processing and an adaptive algorithm for adjusting the coefficients, or weights, of that filter. A general form of adaptive filter is illustrated in FIG. 5, where a received signal 29 is superimposed with a signal 55 in a mixer 56. The signal 55 is the output of a programmable digital filter 57 driven by a reference input noise signal 30. The digital signal 30 is split into two streams 58 and 59. The function of an adaptive block 60 is to receive the stream 59 and to adjust the digital filter coefficients via the loop 61 in order to improve the output signal 34. The digital filter coefficients are selected to minimize the mean-square value of an error signal $e_n$ (MSE), which is a difference between the received information signal $S_n$ corrupted with additive noise $v_{0n}$ and the reference input noise signal $v_{1n}$. The algorithm minimizes the error between the additive noise and the estimation of the noise. It causes the estimate of the noise to be the least square estimate (LSE) of the noise. This results in the best least square estimate of the desired signal as the LSE of the additive noise is subtracted from the initial primary signal. The filter coefficients $w_n^T$ are time varying and updated by the adaptive algorithm, and the superscript T denotes transpose. This algorithm uses variable adaptive step size, $\mu$, to improve the convergence of the algorithms and assure stability; the larger the value of $\mu$, the faster the algorithm.

$$e_n = S_n + v_{0n} - \hat{w}_n^T v_{1n} \quad (1)$$

$$\hat{w}_{n+1} = \hat{w}_n + \mu_n v_{1n} e_{1n} \quad (2)$$

$$\mu_n = \frac{\alpha}{V_{Len} * r_{v1n}} \quad (3)$$

where $\alpha$ is a normalized step size that satisfies the criterion $0<\alpha<2$ and $V_{Len}$ is a length of the moving window; $r_{v1n}$ is the power of the $v_{1n}$ at a time n $$r_{v1n} = (1-\beta) r_{v1(n-1)} + \beta v_{1n}^2 \quad (4)$$

where $\beta$ is a smoothing parameter:

$$\beta = \frac{1}{V_{Len}} \quad (5)$$

The algorithm initiates with:

$\hat{w}_0 = 0$ $r_{v1_{-1}} = 0$ $r_{v0} = v_{10}^2$

Then the adaptive filter output 55 (FIG. 5) is calculated, and the error signal $e_n$ is computed (see (1)). The weight vector adaptation is performed according to (3).

Proposed noise cancellation algorithm works more efficiently than the prior art techniques as it adaptively changes the step size of the algorithm to take advantage of the noise power picked up by the reference signal. In many cases, th noise power of the reference noise may vary significantly and the common techniques failed to converge and maintain stability in such cases. The proposed scheme calculates the power of the data window and modifies the step size for updating the filter coefficients to least square estimate of the noise signal.

This approach processes the data using digital signal processing techniques to cancel additive phase noise introduced by hardware, especially important for fiber connected to the input and output of the devices. It is not limited to free space optics (FSO) (including communications, sensing, etc.), but also applicable to fiber optical communications with various phase modulation schemes of data transmission.

In the preferred embodiment the system recovers the signal with the phase corrupted by vibration noise that has multiple frequency components such as 10 Hz, 300 Hz, 10 kHz etc. In another embodiment the phase of the optical signal is corrupted by multiple frequencies noise (such as music) that has frequency components less than 20 kHz. The innovative approach outperforms existing algorithms to in estimating noise signals that have multiple frequency components. Commonly used techniques do not estimate the noise well when it has more than one frequency components and when the noise power varies significantly from window to window. This scheme can perform least square estimate of noise with multiple frequency components which correlate with resonant vibrations of the platform.

This technique operates in a higher dynamic range of signal to noise ratio (SNR) than conventional schemes. Even when the SNR is around 0 dB, the algorithm works well in estimating the LSE of the noise and canceling the noise from the corrupted signal.

The disclosed noise cancellation technique is very robust, has very high stability and convergence properties. And besides it operates faster that conventional least mean square (LMS) algorithms.

The system sustains its operation characteristics under launch load.

Figure 6:
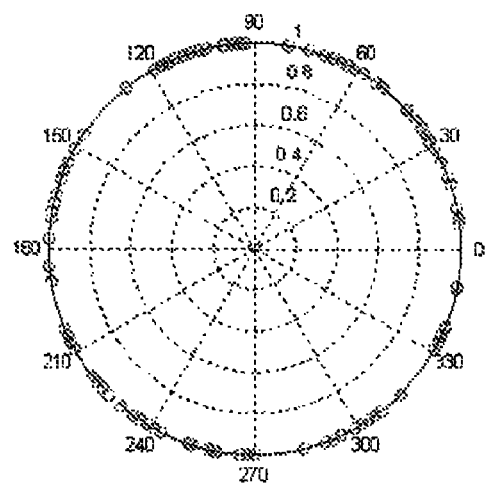
FIG. 6 shows the results of the implementation of the adaptive filtering algorithm to the signal processing, where FIG. 6(a) denotes a received QPSK optical signal.
Figure 6:
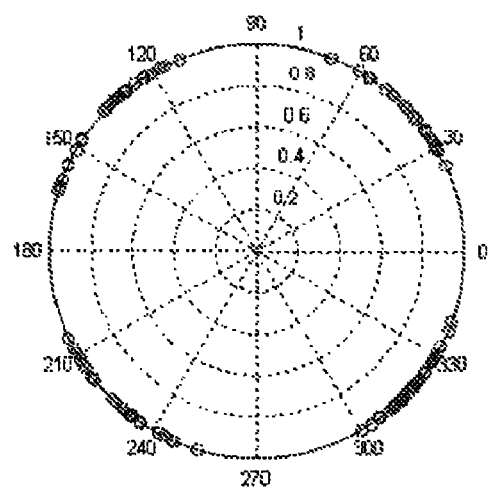
Figure 6:
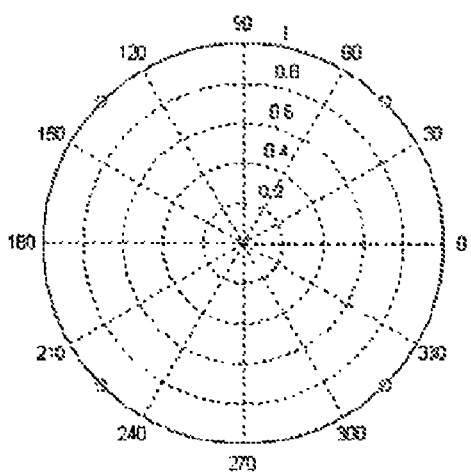

FIG. 6 shows implementation of the adaptive algorithm and threshold detection according to the present invention. FIG. 6(a) denotes a QPSK phase constellation for the received signal with 5 dB SNR. After adaptive filtering (FIG. 6(b)) the signal phase appears to be more centered on points of 45, 135, 225 and 315 degrees. The threshold detection application (FIG. 6(c)) results in correct detection of 85% of symbols.

The system performance in satellite communications is affected by damaging ionizing radiation such as cosmic rays, gamma and X-rays. Microelectronic devices often experience disruption in their structure and operation under harmful radiation conditions. It is another object of the present invention to protect the proposed optoelectronic transceiver from ionizing radiation. In the preferred embodiment the disclosed above transceiver has a protective coating overlying the transceiver housing. In the preferred embodiment the protective coating is sprayed on the transceiver as disclosed in U.S. Pat. No. 6,605,818, incorporated herein by reference. The coating comprises at least one of ionizing radiation protection material selected from the group consisting of a neutron shielding material, a gamma/X-ray shielding material and a capture gamma-ray material. Examples of neutron-shielding materials are iron and copper, examples of gamma/X-ray shielding materials are tungsten, hafnium, tantalum, and lead, and examples of capture gamma-ray materials are boron and lithium.

The description of the preferred embodiments of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical system comprising: an optical receiver receiving a quadrature phase modulated optical signal and producing a digital data output signal;
a first means for measuring an additive phase noise at a receiver site and providing a first correction signal; a digital signal processing (DSP) unit correcting the digital data output signal to recover a signal constellation based on the first correction signal, the first correction signal is an "anti-noise" of equal amplitude and opposite phase of the noise signal, wherein the DSP unit perform an adaptive digital filtering, and the digital filter coefficients are selected to minimize the mean-square value of an error signal, which is the difference between the received quadrature phase modulated signal and a reference input noise signal, and a processing algorithm minimizes an error between the additive noise and an estimation of the noise.

2. The system of claim 1, further comprising: the optical receiver is a coherent optical receiver, in which the phase modulated optical signal is mixed with a local oscillator signal.

3. The system of claim 2, wherein the coherent optical receiver includes 90-degrees optical hybrid.

4. The system of claim 1, wherein the first means includes an accelerometer.

5. The system of claim 1, further comprising: a light source generating an initial optical beam; a second means for evaluating an additive phase noise at a transmitter side and providing a second correction signal; and a phase modulator providing a modulation of the initial optical beam with data; the phase modulator providing a correction of the modulation based on the second correction signal and transmitting the phase modulated optical signal towards the optical receiver.

6. The system of claim 5, wherein the second means includes an accelerometer.

7. The system of claim 5, wherein the modulation is QPSK or QAM modulation.

8. The system of claim 1, wherein the noise is associated with vibration of a platform, on which the light source is positioned.

9. The system of claim 1, wherein the correction uses an active noise control.

10. The system of claim 1, wherein the filter coefficients include weights.

11. The system of claim 1, further comprising a protective coating covering the optical receiver, the first means and the digital signal processing unit to shield them from hard radiation.

12. The system of claim 1, implemented over all types of networks, including intersatellite, ground-satellite, free-space optical links, short haul and long haul terrestrial, submarine, and metro fiber networks.

13. A method for an optical signal transmission, comprising:
receiving a quadrature phase modulated optical signal encoded with data; mixing the phase modulated signal with a local oscillator signal; recovering a signal constellation; correcting the data stream signal constellation in a digital signal processing (DSP) unit based on an adaptive noise control technique; wherein the noise control uses an "anti-noise" correction signal of equal amplitude and opposite phase of the noise signal, and outputting corrected data, wherein the DSP unit perform a digital filtering, and the digital filter coefficients are selected to minimize the mean-square value of an error signal, which is the difference between the received quadrature phase modulated signal and a reference input noise signal, and a processing algorithm minimizes an error between an additive noise and an estimation of the noise.

14. The method of claim 13, further comprising:
mixing the data stream in the digital signal processing unit with a correcting signal from a sensor.

15. The method of claim 13, wherein: the filter coefficients include weights.

16. The method of claim 13, implemented over all types of an optical signal transmission, including optical communications, remote sensing and LADARs.

* * * * *